United States Patent [19]

Dietrich

[11] 4,031,587

[45] June 28, 1977

[54] TOOTHBRUSH FOR CANINES

[75] Inventor: Ursula Dietrich, Hillsborough, Calif.

[73] Assignee: Deepen Enterprises, Inc., San Mateo, Calif.

[22] Filed: July 28, 1975

[21] Appl. No.: 599,579

[52] U.S. Cl. ............................................. 15/167 R
[51] Int. Cl.² .......................................... A46B 9/04
[58] Field of Search .... 15/167, 110, 104.92–104.94

[56] References Cited

UNITED STATES PATENTS

| 1,018,927 | 2/1912 | Sarrazin | 15/167 R |
| 2,845,649 | 8/1958 | Hutson | 15/167 R |

Primary Examiner—Peter Feldman
Attorney, Agent, or Firm—Townsend and Townsend

[57] ABSTRACT

A toothbrush adapted to conform to the shape of the canine jaw and the teeth therein. The toothbrush includes a handle of suitable length to which are attached at least three rows of bristles, wherein a portion of the central row is shorter than the adjacent outer rows thereby defining an axial trough. The ends of the bristles for engaging the teeth define a contour having a peak adjacent to the end of the handle formed of at least one tuft of bristles from each row, a depression adjacent to the peak formed by at least the two outer rows of bristles, and a uniform slope increasing in height to the neck of the handle. The bristles are arranged in tightly clustered tufts which contribute to the stiffness and durability thereof. The shape of the brush promotes the simultaneous cleaning of the cuspid-type and molar-type teeth in the long narrow canine jaw.

2 Claims, 5 Drawing Figures

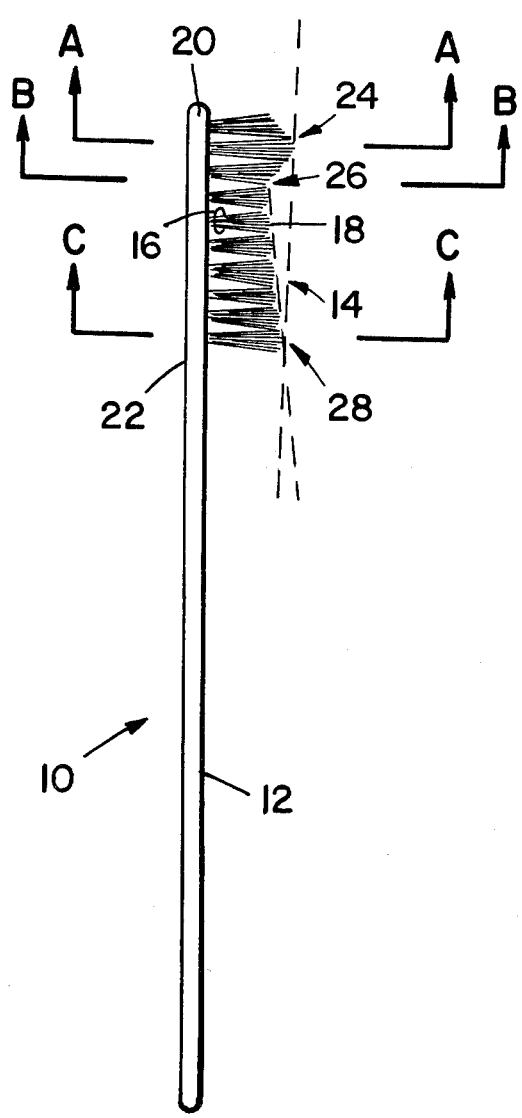
FIG _ 1
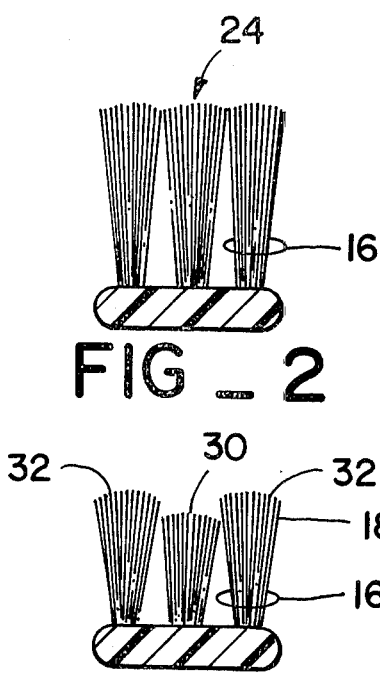
FIG _ 2
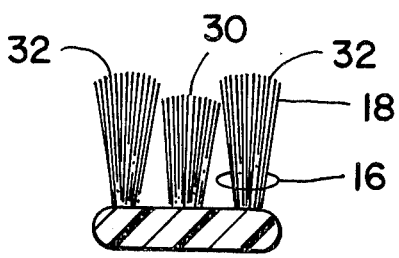
FIG _ 3
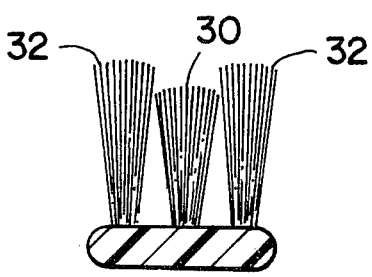
FIG _ 4
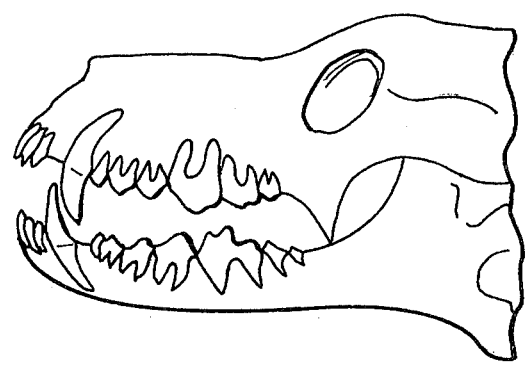
FIG _ A

TOOTHBRUSH FOR CANINES

BACKGROUND OF THE INVENTION

Dogs, like people, should have a regular schedule of teeth cleaning in order to prevent periodontitis, particular in the later years of the dog's life. The problem of tooth decay and gum irritation is even more severe with dogs than humans, since the canine saliva is more viscous and more likely to build up deposits of calculus on the dog's teeth.

The common treatment to remove deposits from dog's teeth is scraping by a veterinary. This technique has many disadvantages. Employing a veterinary is prohibitively expensive on a frequent basis. The scraping results in roughened surfaces, which accelerates the buildup of calculus. And, in the period between treatment the breath of the dog rapidly becomes and remains unpleasant.

There is now available a toothpaste devised for dogs. See co-pending application Ser. No. 18,312, filed Apr. 8, 1974. In order to ensure that the brushing is efficient and that all the teeth are subjected to brushing and debris removal, it is necessary to provide a brush which is capable of reaching all the dog's teeth and able to provide a mechanical brushing of the entire tooth surface.

A dog's jaws and teeth are different from those of a human. Refer to FIG. A of the accompanying drawings for purposes of illustration. The dog's teeth are primarily for tearing. The canine arch is trapezoidal in shape unlike the human arch which is more paraboloidal. As viewed from the side, the canine arch has a reversed curve, rising and dropping from the first to the fourth bicuspid and then swinging upwards to the third molar. Quite often in mature dogs one or two of the molars, top and bottom, are missing so the teeth are spaced apart, leaving gaps between the teeth for accumulation of debris. In contrast to human teeth, the canine teeth have secodontal crowns, with sharp tips as sharp ridges, which function as tearing surfaces.

The toothbrush employed for humans is adapted to the conformation of the human mouth. The different geometry, spacing and formation of canine teeth make the ordinary toothbrush inadequate to provide the mechanical brushing of the canine tooth surfaces and the removal of debris in the spaces between the teeth. There is, therefore, a need for a simple and effective toothbrush adapted especially to the conformation of the canine jaw and spatial relationship of the teeth.

SUMMARY OF THE INVENTION

This invention is a toothbrush adapted to conform to the shape of the canine jaw and the teeth therein. The toothbrush includes a handle of suitable length to which are attached at least three rows of bristles, wherein a portion of the central row is shorter than the adjacent outer rows thereby defining an axial trough. The ends of the bristles for engaging the teeth define a contour having a peak adjacent to the end of the handle formed of at least one tuft of bristles from each row, a depression adjacent to the peak formed by at least the two outer rows of bristles, and a uniform slope increasing in height to the neck of the handle. The bristles are arranged in tightly clustered tufts which contribute to the stiffness and durability thereof. The shape of the brush promotes the simultaneous cleaning of the cuspid-type and molar-type teeth in the long narrow canine jaw.

BRIEF DESCRIPTION OF THE DRAWINGS

FIG. A, previously referred to, is a side view of the jaws and teeth of a dog;

FIG. 1 is a side view of a toothbrush according to the invention;

FIG. 2 is a cross-sectional view along the line A—A of FIG. 1;

FIG. 3 is a cross-sectional view along the line B—B of FIG. 1; and

FIG. 4 is a cross-sectional view along the line C—C of FIG. 1.

DETAILED DESCRIPTION OF THE SPECIFIC EMBODIMENT

Referring to FIG. 1, a toothbrush 10 according to the present invention is shown which is particularly suitable for efficient cleaning of a canine's teeth as previously described. The toothbrush 10 comprises a handle 12 and a head 14 comprising tufts 16 of relatively soft bristles 18 attached to the handle 12 between the handle top 20 and a neck 22.

An important feature of the toothbrush is the relative height of the bristles defining the shape in length and in cross-section of the head 14, which is particularly adapted to efficient brushing of canine teeth. FIGS. 2, 3 and 4 in conjunction with FIG. 1 illustrate this contour. The head comprises at least three rows of tufts 16 along the axis of the handle 12. In an average sized brush, the head 14 is approximately 1cm wide and 3.5cm long. The bristles 18 vary in length from about 1cm at the top 20 to about 1.4cm defining a peak 24 at the point designated A—A approximately 0.5cm from the top, then to a length of approximately 1cm defining a notch 26 at a distance of approximately 1cm from the top 20 designated B—B. The bristles 18 are of increasing length from the notch 26 (point B—B) to the heel 28 (point C—C). The length of the longest bristles 18 at the heel 28 is approximately the same as the length of the bristles at the peak 24. Thus, in side view, the head 14 forms a contour having the peak 24 at A—A, the notch 26 adjacent thereto at B—B and an incline from a low point at B—B to a high point (C—C) at the heel 28.

Referring particularly to FIGS. 2, 3 and 4, the bristles 18 are of uniform length in cross-section from the top 20 up to and including the peak 24. Between the points B—B and C—C the bristles are of non-uniform cross-section length, the central portion or row of bristles being approximately 0.2cm shorter than the outer rows of bristles (FIGS. 3 and 4.) The shorter central row thereby defines an axial trough 30 between points B—B and C—C and the outer rows from ridges 32 adjacent thereto.

The ridge-trough cross-section of the toothbrush is particularly important for brushing the teeth of canines because the shape of the canine teeth are such that the rear teeth are not easily accessible to toothbrushes of conventional design. The trough 30 permits one to insert the toothbrush in the canine mouth with minimum interference from the teeth in front of the rear teeth. Further, as the brush head 14 confronts the canine teeth having secodontal crowns previously described, the trough 30 cooperates with the central tip of the crowns so as to guide the motion of the brush head 14 along the axis of the teeth.

In use, a forward and backward motion of the toothbrush in the above orientation scrubs the table of the rear molars where debris frequently accumulates, and scrubs and massages the top and sides for the forward teeth. As the central trough 30 of the brush head 14 confronts the relatively long, thin forward teeth, the sides of the ridges 32 of the brush head 14 confronts the sides of the same teeth and scrubs the sides of the teeth to and including the gum line. The peak 24 of the brush head 14 is also useful in cleaning between and directly behind the cuspid teeth where there is a large gap. The longer bristles at and near the crown 24 also more readily reach the areas on the tops and sides of the rear molars which are relatively difficult to reach.

A toothbrush according to the present invention may be manufactured in assorted sizes suitable to the size of the dog's mouth. The dimensions herein given are suitable for the mouth of a medium-sized to large-sized dog. The bristles used in the brush should be of stiffness sufficient to provide effective scrubbing action without causing damage to the delicate tissue of the gums. The bristles 18 may be embedded in the handle 12 in a conventional manner in tufts of approximately twelve bristles each. The bristles may be of such suitable material as nylon strands 0.007 inches in diameter. The handle 12 may be of any suitable length, for example, approximately 15cm. The handle need not be so long as to minimize the danger of a dog bite if the toothbrush is used with the canine dentifrice now available which particularly adapts to the animal's tastes.

What is claimed is:

1. A toothbrush for cleaning the teeth of animals which have a long narrow jaw, molars at the rear of the jaw, and secodontal crowned teeth forward of the molars, said toothbrush comprising a handle and a head attached to said handle, said handle having top and bottom ends and an intermediate neck, said head comprising at least three rows of longitudinally extending bristles defining longitudinally a peak adjacent said top end, a heel adjacent said neck, and a substantially linear incline from said heel to the foot of said peak, said incline having a maximum height at said heel substantially corresponding to the maximum height of said peak, and a minimum height at the foot of said peak, said head further defining in cross section along said linear incline from said heel to the foot of said peak, a central longitudinal trough of bristles of uniform diminished height relative to longitudinal outside rows of bristles defining said incline, and at said peak a ridge of bristles of substantially uniform maximum height, the bristles from the top end up to the peaks and down to the foot of said peak being of uniform length in cross-section, the tops of said peak bristles defining surfaces for confronting the tables of the molars at the rear of said jaw, the tops and sides of the outside longitudinal bristle rows of said incline defining surfaces for confronting gums and side faces of secodontal crowned teeth, and the tops and sides of the bristles of said central trough defining surfaces confronting said secodontal crowns, said trough further defining a guideway for tracking the tops of said secodontal crowns along the jaw line upon confrontation between the tops of bristles defining said peak and the tables of the rear molars such that longitudinal translation of said brush head scrubs and massages the gums and the tops and the sides of the teeth.

2. A toothbrush according to claim 1, wherein the minimum height of the outside rows of said incline exceeds the height of said secodontal crowns.

* * * * *